Aug. 11, 1964 G. H. WOLF 3,143,754
WINDOW CLEANING MECHANISM
Filed Oct. 15, 1962 2 Sheets-Sheet 1

INVENTOR.
GILBERT H. WOLF
BY
HIS ATTORNEY

Aug. 11, 1964  G. H. WOLF  3,143,754
WINDOW CLEANING MECHANISM
Filed Oct. 15, 1962  2 Sheets-Sheet 2
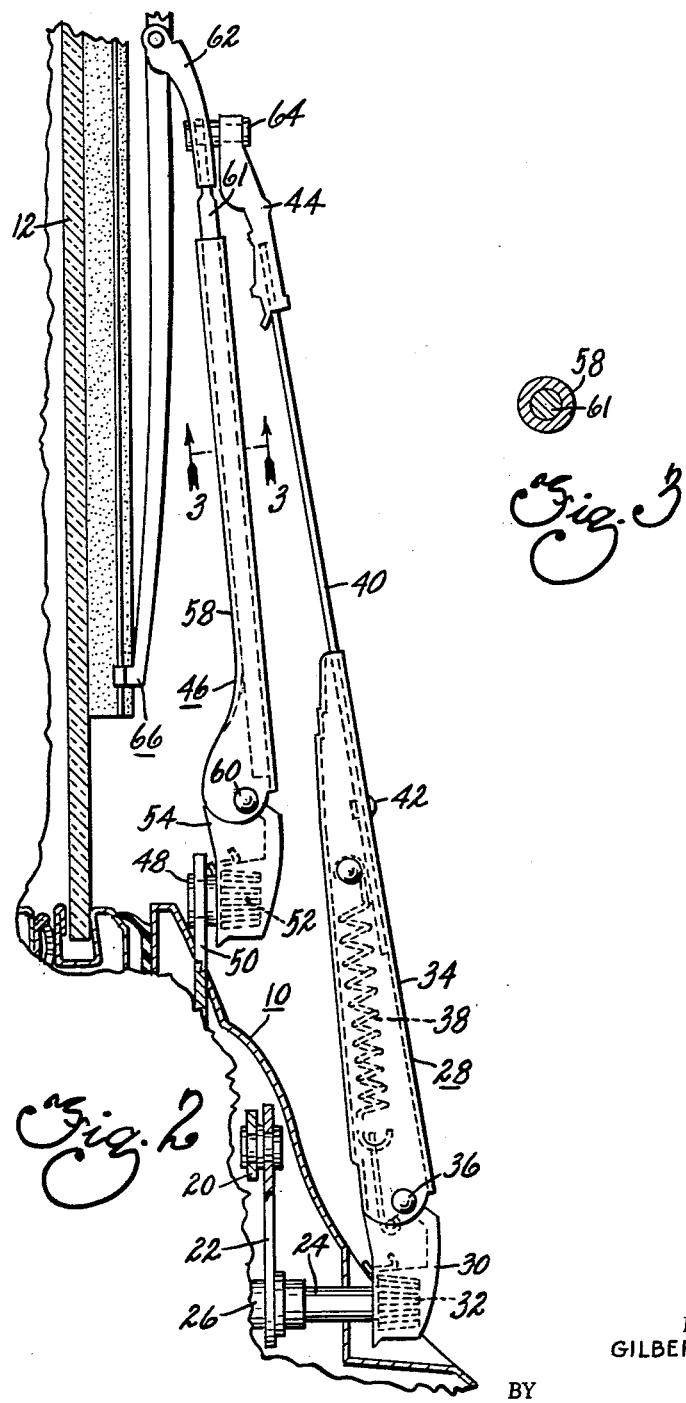
INVENTOR.
GILBERT H. WOLF
BY
W. E. Finken
HIS ATTORNEY United States Patent Office 3,143,754
Patented Aug. 11, 1964

3,143,754
WINDOW CLEANING MECHANISM
Gilbert H. Wolf, Milford, Mich., assignor to General Motors Corporation, Detroit, Mich., a corporation of Delaware
Filed Oct. 15, 1962, Ser. No. 230,419
2 Claims. (Cl. 15—250.23)

This invention pertains to window cleaning mechanisms, and particularly to a combined extensible wiper arm and movement amplifying drive assembly for cleaning the rear window of a vehicle.

In copending application Serial No. 230,417, now Patent No. 3,112,510, filed of even date herewith in the name of Lothrop M. Forbush et al. and assigned to the assignee of this invention, a cleaning system for a tailgate window of a station wagon type vehicle is disclosed wherein a single wiper blade and arm assembly is driven across the window from a motor operated rotary crank through a chain and sprocket type movement amplifying transmission. The present invention relates to a cleaner assembly for tailgate windows wherein the wiper blade is oscillated through an angle of substantially 180° through a linkage drive, and wherein the length of the wiper arm is progressively varied throughout its stroke so as to increase the area cleaned by the wiper blade. More particularly, the path of the wiper blade is extended adjacent the side edges of the window so as to provide increased rear vision.

Accordingly, among my objects are provision of window cleaning mechanism including means for concurrently increasing the angular extent of the wiper blade movement and varying the length of the wiper arm so as to clean a greater area of a window; the further provision of an extensible wiper arm and control means therefor which are automatically operable to extend the wiper arm as it moves towards horizontal positions; and the still further provision of a wiper arm and control means therefor which are automatically operable to increase the angular extent of the wiping stroke.

The aforementioned and other objects are accomplished in the present invention by utilizing a pair of wiper arms, one of which is extensible and retractable, and pivoting the second wiper arm off-center from the pivot axis of the extensible wiper arm. Specifically, in the disclosed embodiment, the power driven wiper arm is pivotally attached to a rockshaft and drive through a linkage from a rotary crank through an angle of approximately 120°. An extensible and retractable wiper arm is pivotally mounted on a stub shaft spaced from the rockshaft and carries a wiper blade for engagement with the window. The power driven wiper arm is pivotally connected to the extensible wiper arm such that during oscillation thereof the extensible wiper arm is progressively extended as it approaches horizontal positions and retracted as it approaches a vertical position, and in addition the stroke of the extensible wiper arm and its wiper blade are increased by the off-center relation of the pivot axes of the two wiper arms.

Further objects and advantages of the present invention will be apparent from the following description, reference being had to the accompanying drawings, wherein a preferred embodiment of the present invention is clearly shown.

In the drawings:

FIGURE 2 is an enlarged fragmentary view, partly in section and partly in elevation, of the improved window cleaning mechanism.

FIGURE 3 is a sectional view taken along line 3—3 of FIGURE 2.

Figure 1:
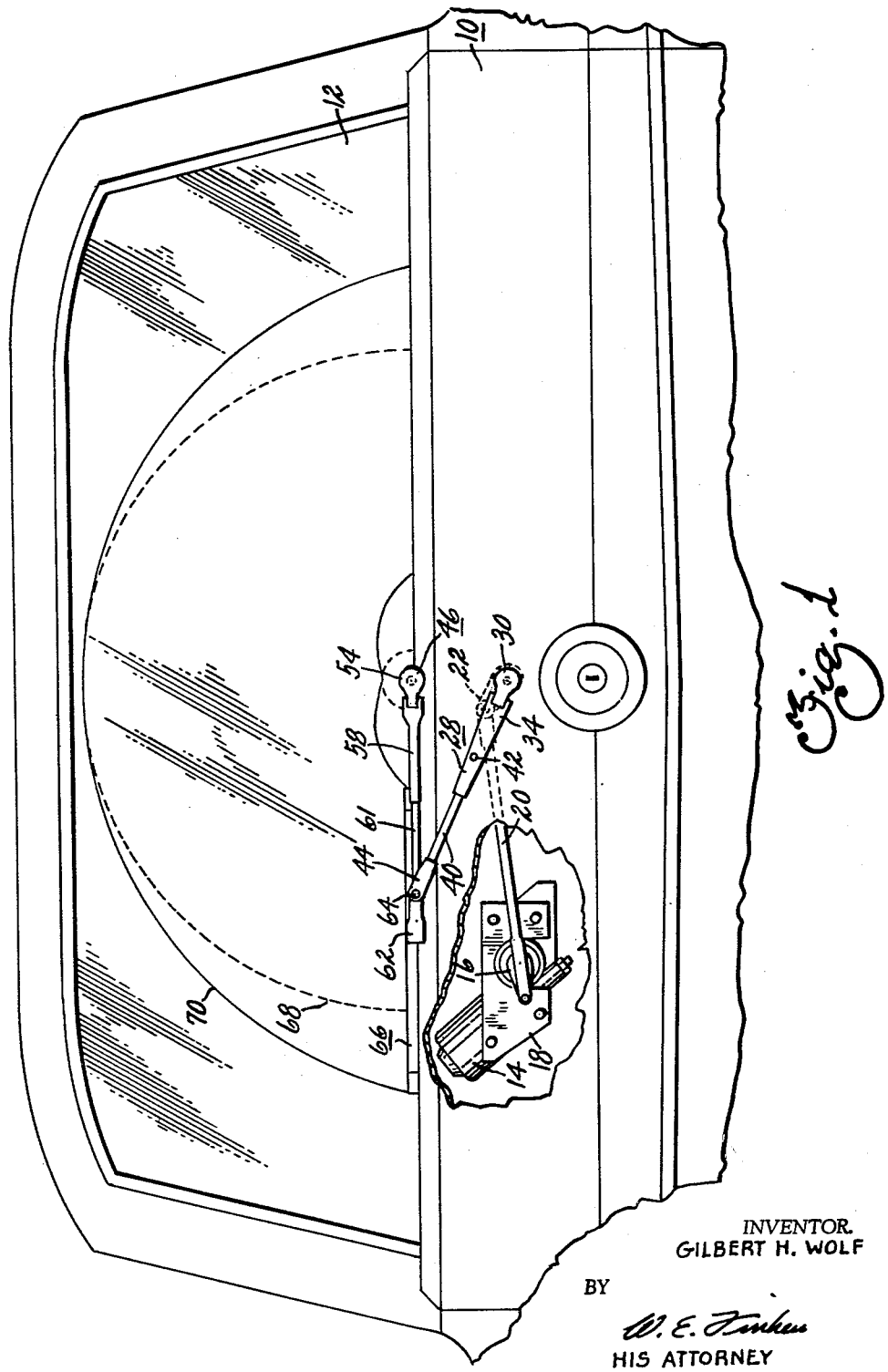
FIGURE 1 is a fragmentary view with certain parts broken away of the vehicle equipped with the window cleaning mechanism of the present invention.

With reference to FIGURE 1, the cleaning mechanism of the present invention is especially adapted for use on a station wagon type vehicle having a tailgate 10 carrying a window 12 capable of being raised and lowered. The cleaning mechanism includes a unidirectional direct current motor 14 connected through a suitable gear reduction to a rotary crank 16, the motor and gear reduction being carried by a bracket 18 suitably attached to the tailgate 10 between the inner and outer panels thereof. The crank arm 16 is pivotally connected to one end of a drive link 20, the other end of which is pivotally connected to a second crank arm 22 which, as seen in FIGURE 2, is attached to a rockshaft 24. The rockshaft 24 projects outwardly from the tailgate 10 and is suitably journalled in a transmission housing 26 mounted within the tailgate.

A wiper arm 28 is drivingly connected to the rockshaft 24, and comprises a mounting section 30 having a socket recess for receiving a serrated spindle 32 attached to the rockshaft 24. An intermediate section 34 is pivotally connected to the socket section 30 by a transversely extending pin 36, and biased towards the window 12 by an extension spring 38. An outer bar section 40 is attached to the channel-shaped intermediate section 34 by a rivet 42 and is detachably connected to a clip 44 at its outer end.

As seen in FIGURES 1 and 2, an extensible and retractable wiper arm assembly 46 is mounted vertically above the wiper arm 28 adjacent the upper edge of the tailgate 10 on an oscillatable stub shaft 48 journalled in an upstanding bracket 50 suitably attached to the tailgate 10. The stub shaft 48 has a serrated spindle 52 in driving engagement with a socket recess in the mounting section 54 of the arm assembly 46. A substantially tubular section 58 is pivotally attached to the mounting section 54 by a transversely extending pin 60, and a rod-type blade carrying section 61 is slidably mounted in telescopic relation within the tubular section 58 for longitudinal movement relative thereto.

The rod section 61 is connected to a wiper blade clip 62, the clips 44 and 62 being interconnected by a rivet 64 which permits relative pivotal movement therebetween. A wiper blade assembly 66 is carried by the clip 62 for movement across the outer surface of the window 12.

It is well recognized that with a rotary crank and drive linkage of the type depicted in FIGURE 1, rotation of the crank cannot be converted into oscillation of a driven member through an angle of more than approximately 120° without the possibility of locking the linkage in a dead center position. Since it is desirable to clean the greatest possible area of the rear window with a single wiper blade and thus oscillate the blade through a stroke of substantially 180°, the oscillatory movement imparted to the longitudinally adjustable arm 46 must be amplified. This is readily accomplished in the present invention by off-setting the axes of the shafts 24 and 48. In addition, by utilizing a telescopic arrangement of sections 58 and 61 of the wiper arm 46, the radius of the path of the wiper blade 66 is progressively varied throughout the stroke of the arm 46. Thus, as shown in FIGURE 1, the arm 46 is substantially fully extended at its horizontal stroke end positions and fully retracted at its vertical midstroke position. In this manner an increased area of the rear window 12 is cleaned over the area which would be cleaned by a conventional wiper arm and blade assembly as shown by the dotted lines 68.

The wiper arm and blade assembly is adapted to be parked in the horizontal position as shown in FIGURE 1. When the motor 14 is energized so as to rotate the crank 16, to and fro movement is imparted to the link 20 so as to oscillate the wiper arm 28. As the wiper arm 28 moves in the clockwise direction towards a vertical position, the wiper arm 46 is progressively retracted. Conversely, as the wiper arm 46 moves from a vertical position towards either horizontal position as shown in FIGURE 1, the arm is progressively extended, thus producing a path indicated by full lines 70.

From the foregoing it is apparent that the present invention enables a substantially greater portion of the window to be cleaned by a single wiper blade by automatically increasing the radius of the path of the wiper blade as it moves from a vertical position, and wherein the stroke of the wiper blade is automatically increased by the control mechanism for the extensible and retractable wiper arm.

While the embodiment of the invention as herein disclosed constitutes a preferred form, it is to be understood that other forms might be adopted.

What is claimed is as follows:

1. Vehicle window cleaning mechanism including, a window, an oscillatable shaft disposed substantially centrally of said window along an edge thereof, a first wiper arm connected to said shaft and having a pair of telescopically arranged sections capable of relative longitudinal movement, a wiper blade attached to the outer end of the longitudinally adjustable section of said first wiper arm, a second wiper arm including spring hinge connected parts pivoted off-center from said shaft, drive means operable to oscillate said second wiper arm throughout a stroke of predetermined angular extent, and means pivotally interconnecting the outer ends of said second wiper arm and the longitudinally adjustable section of said first wiper arm for oscillating said first wiper arm throughout a stroke having a greater angular extent than the stroke of said second wiper arm and concurrently adjusting the length of said first wiper arm so as to fully extend said first wiper arm adjacent its stroke ends and fully retract said first wiper arm at its mid-stroke position.

2. Vehicle window cleaning mechanism including, a window, an oscillatable shaft disposed substantially centrally of said window along an edge thereof, a first wiper arm connected to said shaft comprising a mounting section, a tubular intermediate section pivotally connected to said mounting section and a blade carrying section telescopically supported by said intermediate section, a wiper blade carried by the outer end of the blade carrying section of said first wiper arm, a second wiper arm including spring hinge connected parts pivoted off-center from said shaft, drive means operable to oscillate said second wiper arm throughout a stroke of predetermined angular extent, and means pivotally interconnecting the outer ends of the second wiper arm and the blade carrying section of said first wiper arm for oscillating said first wiper arm throughout a stroke of greater angular extent than the stroke of said second wiper arm between substantially horizontal stroke end positions and a vertical mid-stroke position and concurrently varying the length of said first wiper arm so that said first wiper arm is fully extended at its stroke end positions and fully retracted at its mid-stroke position.

References Cited in the file of this patent

UNITED STATES PATENTS

| 2,915,772 | Ziegler | Dec. 8, 1959 |
| 3,010,137 | Krohm | Nov. 28, 1961 |

FOREIGN PATENTS

| 1,191,595 | France | Apr. 13, 1959 |